US 6,480,545 B1

(12) United States Patent
Symes

(10) Patent No.: US 6,480,545 B1
(45) Date of Patent: Nov. 12, 2002

(54) ARCHITECTURE FOR MULTI-FORMAT VIDEO PROCESSING

(75) Inventor: Peter D. Symes, Grass Valley, CA (US)

(73) Assignee: Grass Valley (U.S.) Inc., Nevada City, CA (US)

(*) Notice: Subject to any disclaimer, the term of this patent is extended or adjusted under 35 U.S.C. 154(b) by 0 days.

(21) Appl. No.: 09/372,447

(22) Filed: Aug. 11, 1999

(51) Int. Cl.[7] ............ H04N 7/12; H04N 11/02; H04N 11/04
(52) U.S. Cl. ............ 375/240.26; 348/443; 348/432.1; 348/441; 348/442; 348/445; 348/444
(58) Field of Search ................ 348/448, 443, 348/432.1, 441, 445, 458, 553, 554, 449; 375/240.26, 240.1, 240.11

(56) References Cited

U.S. PATENT DOCUMENTS

| | | | | | |
|---|---|---|---|---|---|
| 5,532,749 | A | * | 7/1996 | Hong | 348/449 |
| 6,208,382 | B1 | * | 3/2001 | Glenn | 348/448 |
| 6,285,402 | B1 | * | 9/2001 | Miyazaki | 348/445 |
| 6,310,654 | B1 | * | 10/2001 | Oku | 348/554 |
| 6,370,198 | B1 | * | 4/2002 | Washino | 375/240.26 |

* cited by examiner

*Primary Examiner*—Vu Le
*Assistant Examiner*—Charles Parsons
(74) *Attorney, Agent, or Firm*—Joseph S. Tripoli; Harvey D. Fried; Francis A. Davenport

(57) ABSTRACT

An architecture for multi-format video processing of both high definition and standard definition television signals has a pair of processing paths. For HDTV one path processes the luminance component signal and the other path processes an interleaved color difference signal that is the combination of a pair of color difference component signals. For SDTV only a single path is used. The luminance and color difference component signals are interleaved together and optionally stuffed with filler bits to provide an interleaved signal at a high data rate, such as the HDTV data rate or one-half the HDTV data rate, for processing. After processing the SDTV components are deinterleaved from the processed interleaved signal. The color difference component signals may be upsampled prior to interleaving and subsampled after deinterleaving to simplify control signals. Thus the architecture provides a single processor for processing either an HDTV signal or two SDTV signals, one on each of the two HDTV paths.

18 Claims, 3 Drawing Sheets

ARCHITECTURE FOR MULTI-FORMAT VIDEO PROCESSING

BACKGROUND OF THE INVENTION

The present invention relates to video processing architectures, and more particularly to an architecture for multi-format video processing of both high definition television (HDTV) signals and standard definition television (SDTV) signals.

Manipulation of a color video signal generally requires processing of three components, such as one luminance signal and two color difference signals. The two color difference signals usually have half the bandwidth, and in digital systems half the sampling rate, of the luminance signal. In digital processing systems such processing is often called 4:2:2 where the ratio of the numbers indicates the relative bandwidth of the difference signals—luminance (full bandwidth): chrominance 1 (half bandwidth) :chrominance 2 (half bandwidth). The digital color difference signals may be referred to as $C_B$ and $C_R$.

Current state of the art makes use of this relationship by using two processing paths instead of three. One path carries the full bandwidth luminance component signal, while the other carries the half bandwidth color difference component signals in an interleaved fashion. The two processing paths have the same total sampling rate. For SDTV according to the ITU-R 601 standard luminance component signal processing is performed at 13.5 MHz. Since each color difference component signal is sampled at 6.75 MHz, the interleaved color difference signal also has a total sample rate of 13.5 MHz. For HDTV systems, as characterized by SMPTE standards 274M and 296M, the luminance component signal is sampled at 74.25 MHz and the two color difference component signals are each sampled at 37.125 MHz. Current equipment, as shown in FIG. 1, uses two processing paths, each operating at 75.25 MHz.

To provide cost-effective products it is important that one design be used for as many applications as possible, and it is desirable to offer products that use the same design for both SDTV and HDTV processing. It is possible to process SDTV in an HDTV device, but high-speed processing is usually more expensive and this may not be an economical solution.

What is desired is a device that is able to process both SDTV and HDTV signals in an economical manner.

SUMMARY OF THE INVENTION

Accordingly the present invention provides an architecture for multiformat video processing that handles either standard definition television (SDTV) signals or high definition television (HDTV) signals. The luminance component signal of the HDTV signal is processed along one path and the interleaved color difference component signals are processed along a second path. For SDTV only one of the paths is used and, in a unit intended for SDTV only, only one path need be installed. The luminance and color difference component signals are interleaved and optionally stuffed with filler bits to produce an interleaved signal at or below the HDTV data rate. After processing the interleaved signal, the processed component signals are deinterleaved to recover the processed SDTV signal. The color difference component signals may be upsampled prior to interleaving to the same bandwidth as the luminance component signal to simplify control signals generation, and then filtered and subsampled after deinterleaving to recover the processed SDTV signal.

The objects, advantages and other novel features of the present invention are apparent from the following detailed description when read in conjunction with the appended claims and attached drawing.

DETAILED DESCRIPTION OF THE INVENTION

Figure 1:
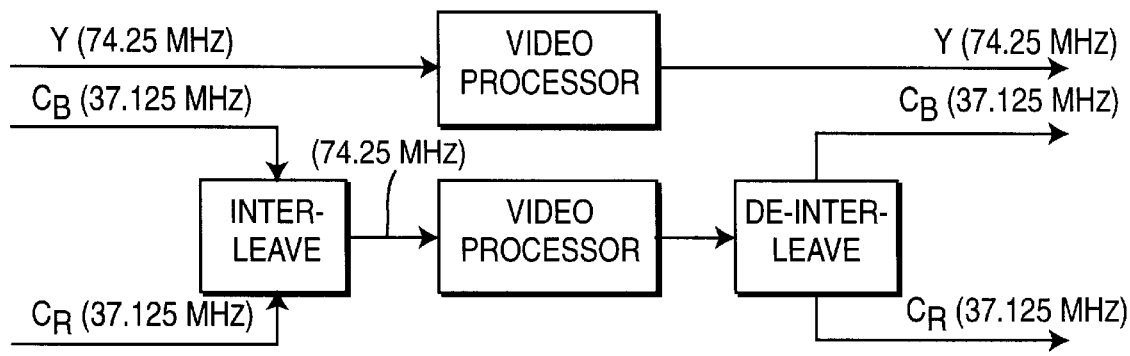
FIG. 1 is a block diagram view of an HDTV signal processing architecture according to the prior art.
Figure 2:
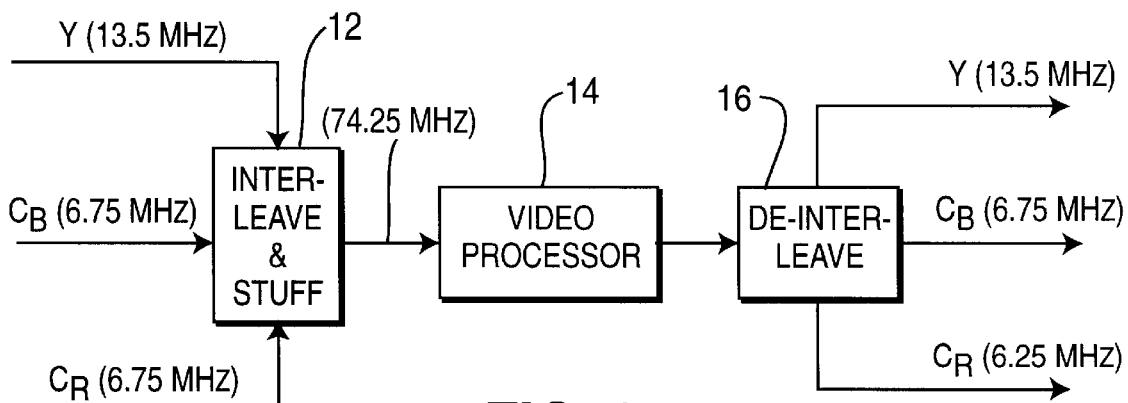
FIG. 2 is a block diagram view of a first embodiment for a multi-format video processing architecture according to the present invention.

In equipment using the present invention the processing paths are designed to operate at the highest required rate, typically 74.25 MHz for high definition television (HDTV) signals. For HDTV two processing paths are used as described in the prior art with reference to FIG. 1. However for standard definition television (SDTV) signals only one processing path is used. As shown in FIG. 2 the luminance and color difference component signals, for example at 13.5 MHz and 6.75 MHz respectively, are input to an interleave and optional bit stuff circuit 12. The interleaving of these signals produces an interleaved signal at 27 MHz for the example cited. The interleaved signal is input to a video processor 14. If the video processor 14 can conveniently be switched to operate at 27 MHz, no bit-stuffing is necessary. Alternatively if it is more convenient to operate the video processor 14 at a higher rate, such as at the 74.25 MHz HDTV sample rate or at one-half the HDTV sample rate, the interleaved signal is bit-stuffed by the interleave circuit 12 to produce the interleaved signal for processing at the higher rate. This optionally bit-stuffed interleaved signal is then processed by the video processor 14 at the higher rate. The processed interleaved signal is input to a deinterleave circuit 16 to strip the stuff bits, if present, and to recover the processed SDTV component signals at their respective sample rates—the luminance component signal at 13.5 MHz and each color difference component signal at 6.75 MHz. Therefore each piece of equipment uses the same design for both SDTV and HDTV, but the implementation of the SDTV product is less expensive since it uses only a single processing path. Depending upon the processing rate of the video processor 14, additional signals also may be carried with the SDTV signals in the multiplexed output from the interleaving circuit 12.

The term "interleaving" is used to describe any form of combination of two or more data streams into a single stream at a higher data rate. In the design of a system using this invention it may be desirable to interleave the three signals on a word-by-word basis such as "Y, $C_B$, $C_R$, ..." Alternatively the requirements of control system generation may make it preferable to buffer the signals in a memory so that all the luminance samples representing a televison active video line, for example, are sent followed by all the corresponding $C_B$ and $C_R$ samples for that line in order. Implementation of these alternatives are obvious to one practiced in the art. Also a single HDTV processor may be used to process two SDTV signals, each SDTV signal using a different one of the HDTV signal paths.

Figure 3:
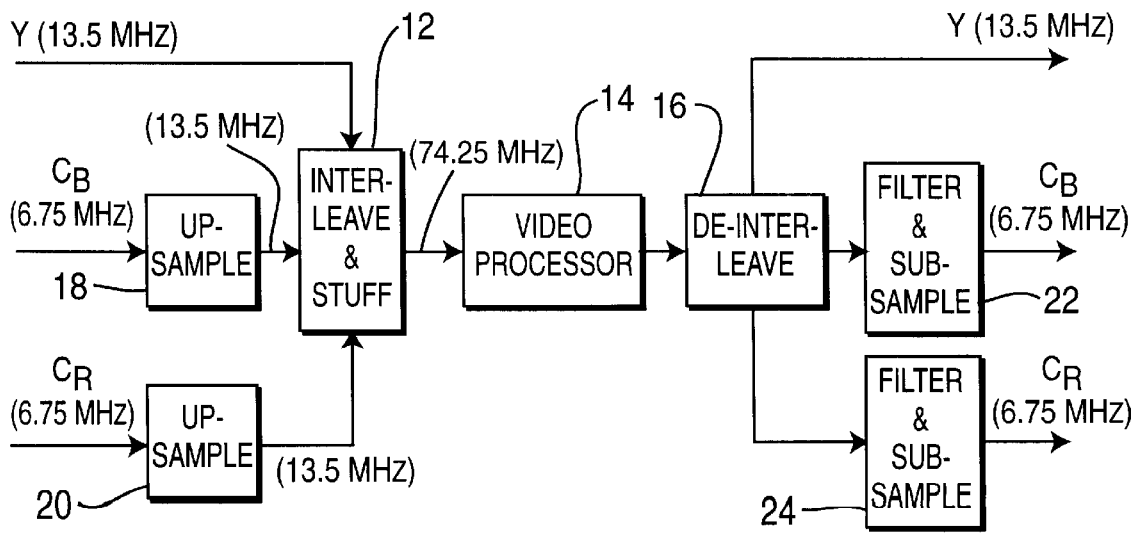
FIG. 3 is a block diagram view of a second embodiment for a multiformat video processing architecture according to the present invention.

The differences in the component signal bandwidths require differences in the control signals applied. Therefore an alternative embodiment is shown in FIG. 3 where the color difference component signals are first input to respective upsamplers 18, 20 that oversample by 2:1 to produce full bandwidth signals for input to the interleave and bit-stuff circuit 12. The up-sampling may be incorporated into the interleave circuit 12. At the output of the deinterleave circuit 16 for the color difference component signals respective filters and down samplers 22, 24 are provided that filter the signals to the original bandwidth and subsample 1:2 to restore the original sample rates of the color difference component signals. This filtering and down sampling may be incorporated into the deinterleaving circuit 16.

Figure 4:
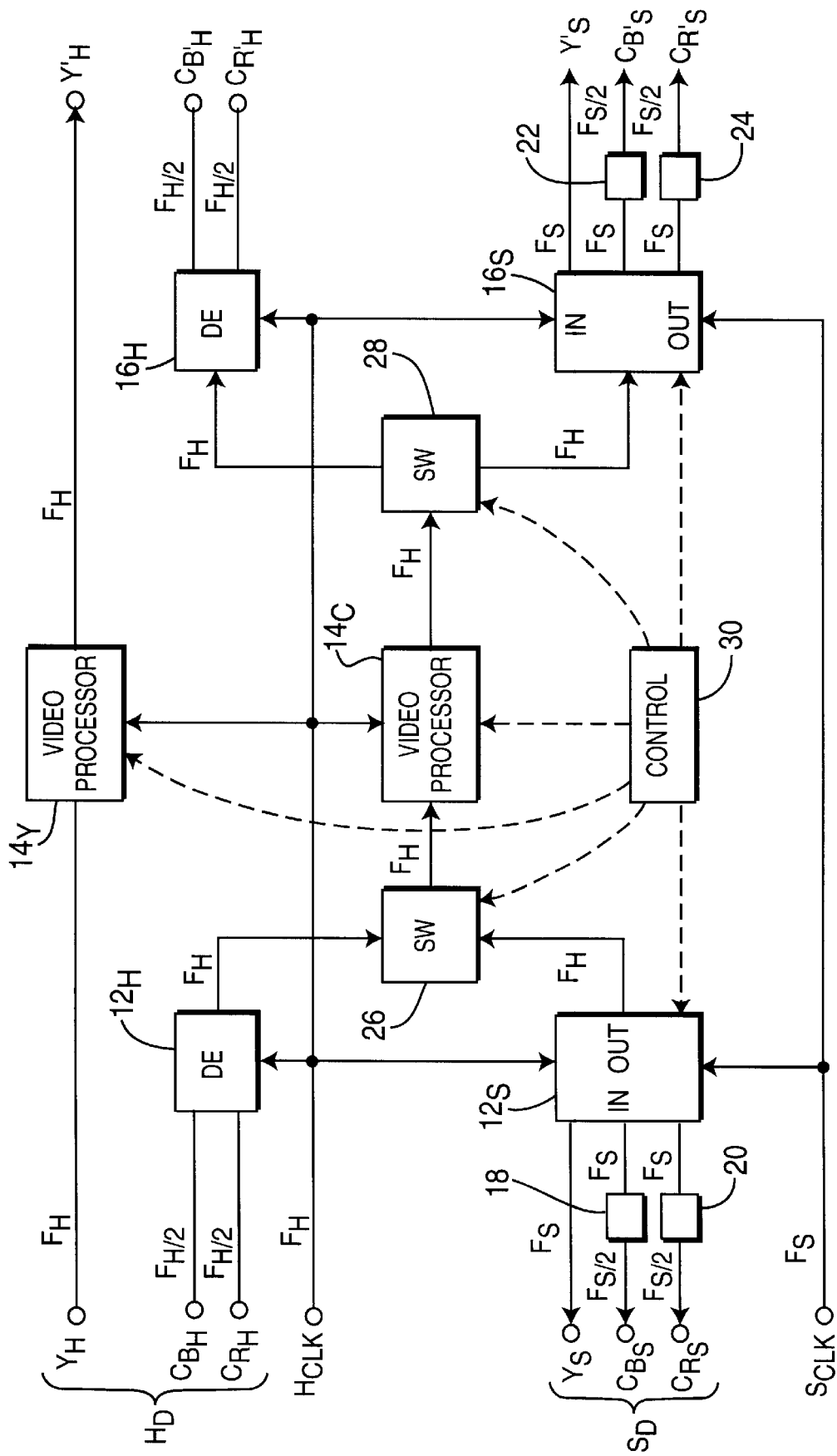
FIG. 4 is a block diagram view of yet another embodiment for a multiformat video processing architecture according to the present invention.

A combination HDTV and SDTV architecture is shown generally in FIG. 4. A set of terminals is provided for an HDTV input signal, having a luminance component $Y_H$ and two chrominance (color difference) components $C_{BH}$ and $C_{RH}$ as well as an HDTV clock signal HCLK at frequency $F_{HD}$. Another set of terminals is provided for a first SDTV input signal, having a luminance component $Y_S$ and two chrominance (color difference) components $C_{BS}$ and $C_{RS}$ as well as an SDTV clock signal SCLK at frequency $F_S$. A third set of terminals is provided for a second SDTV input signal similar to the first SDTV signal. These input signals are input to an interleave switch 26 which provides two output paths—a luminance and an interleaved chrominance path for HDTV or two interleaved SDTV paths. The signals on the two paths are processed in respective video processors 14Y, 14C and the processed signals are input to a deinterleave switch 28. The outputs from the deinterleave switch are either the process HDTV signal or up to two SDTV signals.

Figure 5:
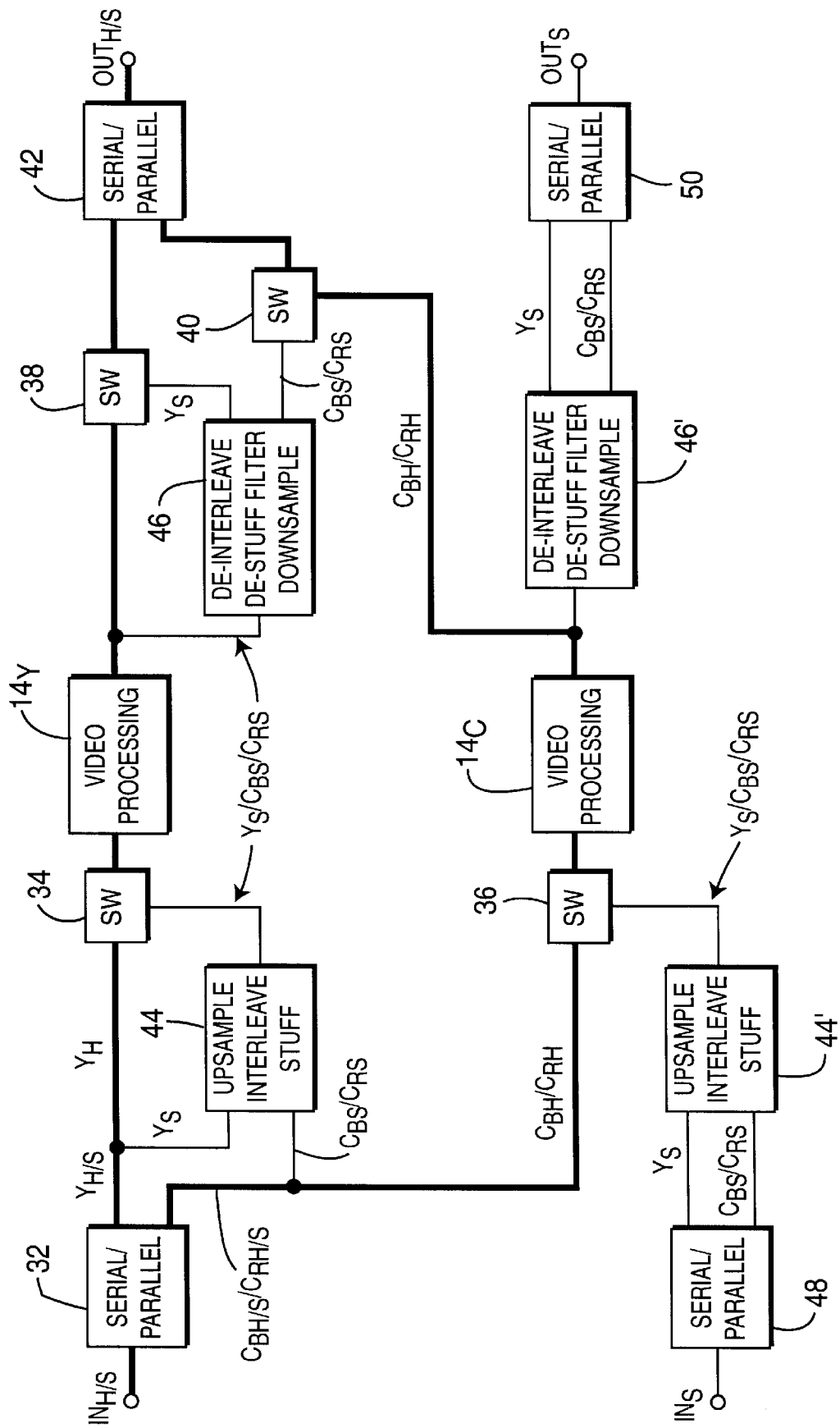
FIG. 5 is a detailed block diagram view for the embodiment of FIG. 4 for a multi-format video processing architecture according to the present invention.

The details for the multi-format archtecture are shown in more detail in FIG. 5. A video signal IN, either high definition or standard definition, is applied to a serial/parallel converter 32 that provides a parallel luminance component output and an interleaved chrominance component output. The clock rate used depends upon the nature of the input signal—HCLK for high definition and SCLK for standard definition. For HDTV the luminance component passes through a first input switch 34 to the luminance video processor 14Y and the interleaved chrominance component passes through a second input switch 36 to the chrominance video processor 14C. The outputs from the processors 14Y, 14C are input via respective output switches 38, 40 to a parallel to serial converter 42 that provides a processed video signal OUT, either HDTV or SDTV according to the input video signal.

For SDTV the luminance and interlaced chrominance components are input to an upsample/interleave/stuff circuit 44, the output of which is input to the first input switch 34. For SDTV processing the first input switch 34 is configured to pass the interleaved SDTV signal to the luminance video processor 14Y. The clock applied to the upsample/interleave/stuff circuit 44 is the processor clock which determines whether stuffing is required—a high frequency processor clock for SDTV requires stuffing. At the output of the luminance video processor 14Y the processed interleaved SDTV signal is input to a deinterleave/destuff/filter/downsample circuit 46 that is clocked by the processor clock. The output from the deinterleave/destuff/filter/downsample circuit 46 is an SDTV luminance component and an SDTV interleaved chrominance component. The SDTV components are input to the respective output switches 38, 40 which are configured to pass the SDTV components when the input video signal is an SDTV signal.

For a second SDTV path through the HDTV processor a second serial/parallel converter circuit 48 operating with SCLK has a dedicated second SDTV video signal input, providing the three video components luminance and the two chrominance components—to a second upsample/interleave/stuff circuit 44' comparable to the one in the first (HDTV luminance) path. The second input switch 36 is configured to pass the interleaved SDTV signal to the chrominance video processor 14C. The output of the chrominance video processor 14C is input to a second deinterleave/destuff/filter/downsample circuit 46' comparable to that in the first (HDTV luminance) path. The resulting SDTV components are then input to a second parallel/serial converter 50 to convert the components to an output SDTV signal. In this manner a single HDTV processor may process either a single HDTV signal or up to two SDTV signals. Such a processor may be designed to provide a single processor, such as a mix/effects system or picture manipulation channel for HDTV, or two such mix/effects or channels for SDTV, according to the user's requirements at the time.

Thus the present invention provides an architecture for multi-format video processing that processes HDTV conventionally along two paths, while processing SDTV along one of the HDTV paths by interleaving the video components together with optional stuff bits for processing at a higher bit rate, and then deinterleaving the processed components to produce processed SDTV.

What is claimed is:

1. An architecture for multi-format video processing having a pair of paths for processing the components of a high definition television signal at a high definition data rate comprising:

means for interleaving the components of a standard definition television signal at a low data rate to form an interleaved signal at a high data rate on one of the paths, the high data rate being less than or equal to the high definition data rate;

means for processing the interleaved signal at the high data rate to produce a processed interleaved signal; and means for deinterleaving the processed interleaved signal to produce processed components for the standard definition television signal at the low data rate;

whereby only one of the pair of paths is used for processing the standard definition television signal.

2. The architecture as recited in claim 1 wherein the components comprise a full bandwidth component and a half bandwidth component.

3. The architecture as recited in claim 2 further comprising:

means for up-sampling the half bandwidth component to become an upsampled full bandwidth component prior to input to the interleaving means; and means for filtering and down-sampling the processed upsampled full bandwidth component at the output of the deinterleaving means to produce a processed half bandwidth component.

4. The architecture as recited in claim 1 wherein the interleaving means further comprises means for stuffing bits into the interleaved signal to achieve the high data rate.

5. The architecture as recited in claims 1, 2, 3 or 4 wherein the interleaving means performs word-by-word interleaving and the interleaved signal carries one or more words from each component of the standard definition television signal in a fixed, regular sequence.

6. The architecture as recited in claims 1, 2, 3 or 4 wherein the interleaving means performs interleaving in conjunction with a buffer memory and the interleaved signal carries a large number of samples from one component of the standard definition television signal followed by a related large number of samples from each other component of the standard definition television signal in order.

7. An architecture for multi-format video processing having a pair of paths for processing the components of a high definition television signal at a high definition data rate comprising:

an interleaving circuit having as inputs the components of a standard definition television signal at a low data rate and providing as an output an interleaved signal at a high data rate on one of the paths, the high data rate being less than or equal to the high definition data rate;

a video processor having as an input the interleaved signal having as an output a processed interleaved signal at the high data rate; and a deinterleaving circuit having as an input the processed interleaved signal and having as an output processed components for the standard definition television signal at the low data rate;

whereby only one of the pair of paths is used for processing the standard definition television signal.

8. The architecture as recited in claim 7 wherein the components comprise a full bandwidth component and a half bandwidth component.

9. The architecture as recited in claim 8 further comprising:

an up-sampler having as an input the half bandwidth component and providing as an output an upsampled full bandwidth component coupled to the input to the interleaving circuit; and a filter and down-sampler having as an input the processed upsampled full bandwidth component from the output of the deinterleaving circuit and having as an output a processed half bandwidth component.

10. The architecture as recited in claim 7 wherein the interleaving circuit comprises a stuffing circuit for stuffing bits into the interleaved signal to achieve the high data rate.

11. The architecture as recited in claims 7, 8, 9 or 10 wherein the interleaving circuit performs word-by-word interleaving and the interleaved signal carries one or more words from each component of the standard definition television signal in a fixed, regular sequence.

12. The architecture as recited in claims 7, 8, 9 or 10 wherein the interleaving circuit comprises a buffer memory for interleaving and the interleaved signal carries a large number of samples from one component of the standard definition televison signal followed by a related large number of samples from each other component of the standard definition television signal in order.

13. A method of multi-format video processing with an architecture having a pair of paths for processing the components of a high definition television signal at a high definition data rate comprising the steps of:

interleaving the components of a standard definition television signal at a low data rate to form an interleaved signal at a high data rate on one of the paths, the high data rate being less than or equal to the high definition data rate;

processing the interleaved signal at the high data rate to produce a processed interleaved signal; and deinterleaving the processed interleaved signal to produce processed components for the standard definition television signal at the low data rate;

whereby only one of the pair of paths is used for processing the standard definition television signal.

14. The method as recited in claim 13 wherein the components comprise a full bandwidth component and a half bandwidth component.

15. The method as recited in claim 14 further comprising the steps of:

up-sampling the half bandwidth component to become an upsampled full bandwidth component prior to input to the interleaving step; and filtering and down-sampling the processed upsampled full bandwidth component at the output of the deinterleaving step to produce a processed half bandwidth component.

16. The method as recited in claim 13 further comprising the step of stuffing bits into the interleaved signal to achieve the high data rate.

17. The method as recited in claims 13, 14, 15 or 16 wherein the interleaving step performs word-by-word interleaving and the interleaved signal carries one or more words from each component of the standard definition television signal in a fixed, regular sequence.

18. The method as recited in claims 13, 14, 15 or 16 wherein the interleaving step performs interleaving in conjunction with a buffer memory and the interleaved signal carries a large number of samples from one component of the standard definition television signal followed by a related large number of samples from each other component of the standard definition television signal in order.

\* \* \* \* \*